Aug. 23, 1932.   G. W. GILLETT   1,873,382
BEARING FOR ENGINE CRANKSHAFTS
Filed Sept. 16, 1929

INVENTOR
Glenn W. Gillett
BY Chappell & Earl
ATTORNEYS

Patented Aug. 23, 1932

1,873,382

UNITED STATES PATENT OFFICE

GLENN W. GILLETT, OF LANSING, MICHIGAN, ASSIGNOR TO NOVO ENGINE COMPANY, OF LANSING, MICHIGAN

BEARING FOR ENGINE CRANKSHAFTS

Application filed September 16, 1929. Serial No. 392,972.

The object of the invention is to provide an improved construction of crankshaft with center ball bearing.

Objects pertaining to details will appear from the description to follow. A structure which is a preferred embodiment of my invention is illustrated in the accompanying drawing, in which.

The parts will be identified by their numerals of reference which are the same in all the views.

1 is the cylinder block of an engine. 2 is the water jacket. 3 is the crankshaft which is a four throw crankshaft provided with balance wheel 4 and end thrust bearings 5, 6 carried in suitable bearing plates 7, 8 at each end of the cylinder block.

The cylinder block is like that illustrated in the patent application of Henry Fisher, Ser. No. 97,248, filed Mar. 25, 1926, for internal combustion engines, the same being an integral structure without joints except the openings for the bearings. The center bearing is supported by a bracket 9 and, because of the fact that the crank case is not divided, it is necessary to insert the bearing over the end of the crankshaft and then provide means for supporting it in place.

Figure 1:
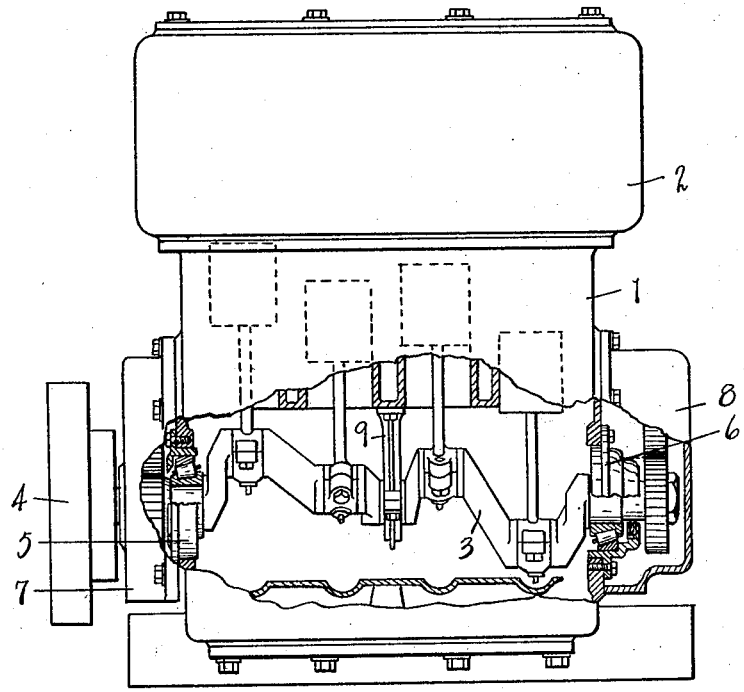
Fig. 1 is an elevation view of a four cylinder gasoline engine with the crank case broken and shown in section, the end bearings partially in section to show details of construction.
Figure 2:
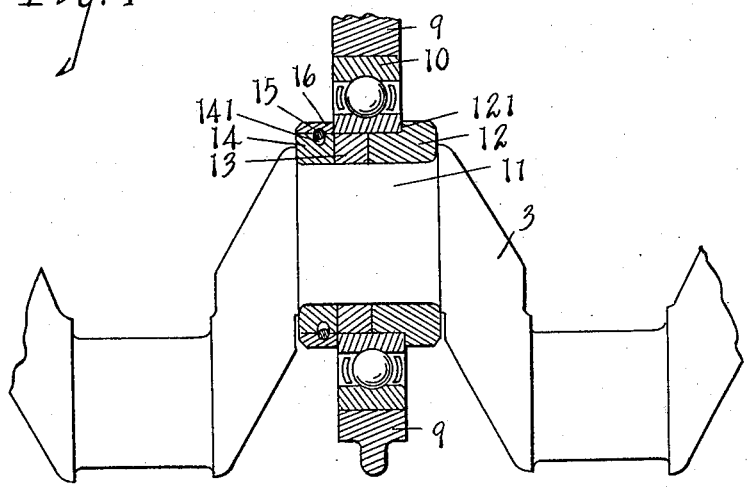
Fig. 2 is an enlarged fragmentary detail view of a crankshaft with a central bearing in vertical central section.

Ball or roller bearing with spacer and container 10 is of any usual construction. It is inserted in place by placing it over the central journal 11 of the crankshaft and disposing it to the left thereof, as illustrated in Fig. 2. A split bushing 12 with a shoulder 121 is then disposed in place at the right hand end of the journal 11. Ball bearing 10 is then pushed to place within the bracket 9 and over the reduced portion of the bushing 12. A divided sleeve 13 is then introduced and pushed within the ball bearing 10 into close proximity to the bushing 12. A divided spacer ring 14 is then inserted in the space on the journal at the left of the sleeve 13. This has a peripheral groove 141 which receives a retainer spring lock ring 15. An internally grooved retainer collar 16 is then crowded over the lock ring 15 and is retained in place thereby in proximity to the left hand end of the ball bearing ring 10. The structure is thus complete, and as there is no thrust on this bearing, it is very effective in operation. The thrust of the crankshaft is taken care of by Timken tapered roller thrust bearings at each end, as stated.

While I have described the structure of my improved bearing in its particular engine relation, it is available generally, but especially so in this relation. I desire to claim this invention specifically and also broadly as pointed out in the appended claims.

Having thus described my invention, what I claim as new and desire to secure by Letters Patent, is:

1. In a structure of the class described, a crankshaft, a central bearing bracket, a ball or roller bearing ring case adapted to be supported thereby and adapted to pass over the shaft, a split shouldered bushing disposed in one end of the said bearing, a split sleeve introduced into the said bearing case ring to fill the same, a divided spacer retainer ring with peripheral groove, a lock spring for retaining the same, and a protecting collar with internal groove to embrace said lock spring and to be held in place thereby.

2. In an internal combustion engine, the combination of a crank case, a central bearing bracket therefor having a ring frame for the bearing with a removable cap of such diameter as to readily receive the ball race, ball or roller bearing means having outer and inner races of such diameter as to be readily introduced and manipulated over the crank shaft fitting within the said ring aperture, an inner bearing race, a shouldered split bushing to be placed upon the crank center and to be disposed within the inner bearing race to support the same, a divided sleeve disposed within the inner race, a divided retainer ring outside the same, a retainer spring lock engaging the same, and an internally grooved retainer collar to yieldingly embrace the said spring and retain the said divided spacer ring in place.

In witness whereof I have hereunto set my hand.

GLENN W. GILLETT.